United States Patent [19]

Snelgrove et al.

[11] 4,144,217
[45] Mar. 13, 1979

[54] PLASTICIZER BLENDS FOR POLYVINYL BUTYRAL INTERLAYERS

[75] Inventors: James A. Snelgrove, Monson; Donald I. Christensen, East Longmeadow, both of Mass.

[73] Assignee: Monsanto Company, St. Louis, Mo.

[21] Appl. No.: 873,346

[22] Filed: Jan. 30, 1978

[51] Int. Cl.² .................................................. C08K 5/12
[52] U.S. Cl. ............................... 260/31.8 W; 428/437
[58] Field of Search .................... 260/31.8 R, 31.8 W; 428/437

[56] References Cited

U.S. PATENT DOCUMENTS

| | | | |
|---|---|---|---|
| 2,124,315 | 7/1938 | Ryan | 260/31.8 W |
| 2,200,969 | 5/1940 | Ryan | 260/31.8 W |
| 2,527,793 | 10/1950 | Bump | 260/29.1 SB |
| 3,211,688 | 10/1965 | Eisenhard | 260/31.4 R |
| 3,522,143 | 7/1970 | Motter | 428/437 |
| 3,841,955 | 10/1974 | Coaker | 428/437 |
| 3,884,865 | 5/1975 | Fariss | 260/31.8 R |

OTHER PUBLICATIONS

Modern Plastics Encyclopedia, vol. 51, No. 10A, Oct. 1974, pp. 775, 781, 782A.

*Primary Examiner*—Paul R. Michl
*Attorney, Agent, or Firm*—David Bennett; William J. Farrington; James C. Logomasini

[57] ABSTRACT

A polyvinyl butyral composition useful as an interlayer in architectural glazing units is plasticized by a blend of a di($C_5$ to $C_8$ alkyl) adipate and a $C_3$ to $C_6$ alkyl benzyl phthalate.

7 Claims, No Drawings

PLASTICIZER BLENDS FOR POLYVINYL BUTYRAL INTERLAYERS

BACKGROUND OF THE INVENTION

This invention relates to plasticized polyvinyl butyral interlayers for use in laminated glazing units. More particularly it relates to polyvinyl butyral interlayers plasticized with a blend of plasticizers which together exhibit a desirable range of properties that make such interlayers useful in the production of laminated glazing units for architectural purposes.

The major property required of a plasticized polyvinyl butyral interlayer suitable for the production of laminates for architectural purposes is edge stability, that is, its ability to resist delamination at the edges of the laminate, particularly after many years of exposure to a humid environment. Laminates for architectural purposes must meet an exceptionally high standard of edge stability not demanded of laminates used in automotive windshields which have a shorter expected life span than architectural laminates.

Edge stability of closely related to compatibility in the sense that if the plasticizer is incompatible with the polymer, it will readily be lost at the laminate edge by, for example, exudation or displacement by water. Thus unless the plasticizer has outstanding compatibility, a laminate employing as the interlayer a polyvinyl butyral plasticized with that plasticizer is unlikely to exhibit a sufficiently high degree of edge stability to permit its use for architectural purposes.

Another characteristic that is highly desirable in an architectural glass laminate is an adequate impact strength. It is known that some plasticizers have a disastrous effect on the impact strength, especially at low temperatures, of laminates incorporating an interlayer plasticized thereby. The plasticizer combinations of the present invention however are capable of being used to produce laminates which also meet the necessary impact strength criteria for use as architectural glass.

DISCUSSION OF THE PRIOR ART

U.S. Pat. No. 3,884,805 discloses polyvinyl butyral interlayers plasticized with dihexyl adipate. The interlayers claimed therein are shown to have very good impact strength and edge stability after three months of exposure to the atmosphere. These claimed materials have gained commercial approval in automotive application.

For a variety of architectural purposes however it is desirable to use a laminate safety glass with improved edge stability over very long periods of time. The present invention provides an improvement over that described in U.S. Pat. No. 3,884,805 in that the edge stability of the glass laminates made with the plasticized polyvinyl butyral interlayers of the present invention is improved.

The improvement referred to above is brought about by the use of a blend of an adipate plasticizer with a phthalate in a certain range of proportions. The phthalate chosen is an alkyl benzyl phthalate and while such compounds are known individually as plasticizers for polyvinyl butyral from, for example, U.S. Pat. Nos. 2,527,793 and 3,211,688, in practice they are highly unsuitable for use alone. This is because glass laminates incorporating interlayers plasticized thereby have very low impact strength especially at low temperatures (0° C.).

Surprisingly the blend of adipate and phthalate plasticizers gives a laminate with excellent long-term edge stability and an adequate impact strength that is well adapted for use in the kind of architectural applications where other conventionally useful plasticizers would prove less acceptable.

DESCRIPTION OF THE INVENTION

The present invention provides a polyvinyl butyral composition plasticized with an effective amount of a blend of plasticizers consisting of from 15 to 85 percent by volume of a di($C_5$ to $C_8$ alkyl) adipate and correspondingly from 85 to 15 percent by volume of a $C_3$ to $C_6$ alkyl benzyl phthalate.

The effectiveness of this combination is surprising since the phthalate component when used along gives laminates with excellent edge stability but reduces the low temperature impact strength of such laminates significantly. On the other hand, when laminates incorporating the adipate plasticizer alone are subjected to the extremely severe long-term testing required to prove an architectural glass laminate, a certain amount of edge delamination is observed which may be unacceptable in some applications.

The number of parts by weight of the plasticizer blend used in the interlayer can be from 10 to 150 but in practice the preferred interlayers comprise from 20 to 100 parts and still more preferably 20 to 60 parts by weight based on 100 parts by weight of the polyvinyl butyral.

The proportions of the components in the plasticizer blend are of course critical to obtain the synergistic effect and it is found that if the adipate/phthalate volume ratio is maintained in the range 85:15 to 15:85, the effect is shown.

The selection of the optimum formulation for the plasticizer combination depends on the relative importance of edge stability and impact strength at low temperatures. If edge stability is the more significant the combination will contain a major proportion of the phthalate whereas in an application in which impact strength is the major concern the adipate will dominate.

In architectural glass the quality of the edge stability is usually the dominating consideration so that the preferred compositions of the invention contain from 30 to 70 vol. percent of the adipate and correspondingly from 70 to 30 vol. percent of the phthalate.

The di($C_5$ to $C_8$) alkyl adipate component may be one of the dipentyl, di-n-hexyl, di-cyclohexyl, diheptyl or dioctyl homologues or adipates having mixed exterifying groups within this series or perhaps a mixture of such adipates. The preferred adipate is however di-n-hexyl adipate.

The alkyl benzyl phthalate is conveniently a $C_3$ to $C_6$ alkyl benzyl phthalate such propyl benzyl phthalate, n-hexyl benzyl phthalate, n-butyl benzyl phthalate, isobutyl benzyl phthalate and n-pentyl benzyl phthalate. Of these the readily available n-butyl benzyl phthalate is preferred.

The polyvinyl butyral is conventionally prepared by the reaction of butyraldehyde with a hydrolyzed polyvinyl ester such as polyvinyl acetate and usually comprises residual alcohol and ester groups. Suitable polyvinyl butyrals can contain up to about 4 percent by weight of ester groups, calculated as polyvinyl ester, and from 10 to 30 percent by weight of hydroxyl groups, calculated as polyvinyl alcohol, the balance being polyvinyl butyral. Preferred polymers comprise from 15 to 25 percent of hydroxyl groups, calculated as polyvinyl alcohol.

DESCRIPTION OF THE PREFERRED EMBODIMENTS

The compatibility of a plasticizer with polyvinyl butyral is conveniently measured by its "cloud point" or the "absorption" of the plasticizer by the polyvinyl butyral.

*Cloud Point* — This is determined by forming a solution of one half gram of the polyvinyl butyral in 10 ml (measured at room temperature) of the plasticizer at a temperature at which a clear solution is formed and then slowly lowering the temperature, (measured using a thermometer inserted into the solution), until the solution becomes cloudy through separation of the polymer from solution. The point at which the thermometer held at the back of the tube can no longer be read is the "cloud point". Testing of a number of plasticizers under identical conditions to determine their cloud points gives a very good indication of their relative compatibilities with the polymer. The lower the cloud point, the more compatible are the two components.

*Absorption* — In this test a thin sheet of the polyvinyl butyral is dipped into the plasticizer for a fixed period before being removed, dried and weighed. This process is repeated until no further gain in weight occurs. If this test is repeated using different plasticizer compositions but otherwise identical conditions, the relative absorptions of the plasticizers by the polyvinyl butyral show the relative compatibilities of the various plasticizers with the polyvinyl butyral.

These two tests are used as a preliminary indication that the blends may be effective plasticizers for polyvinyl butyral intended for use in the production of glass laminates capable of withstanding prolonged exposure to sun and atmosphere without deterioration. The samples passing this screen were exposed in Florida and Arizona for up to two years and where thereafter evaluated for their appearance and edge stability.

In the following examples, the compatibility of various blends of plasticizers with polyvinyl butyral is assessed using the above two tests and the blends having the best compatibility were assessed using exposure tests of the most rigorous kind.

EXAMPLE 1

This Example examines the cloud points of various combinations of butyl benzyl phthalate (BBP) with dihexyl adipate (DHA) measured according to the techniques described above.

In each case the same amount of a polyvinyl butyral having an hydroxyl content of 20.8 percent by weight, measured as polyvinyl alcohol, was dissolved in the same total volume of the plasticizer. The temperature at which cloudiness began to appear and the temperature at which the thermometer could no longer be read were noted.

The results obtained by varying the proportions of BBP and DHA in the plasticizer composition are set forth in Table I below.

TABLE I

| CLOUD POINTS | | | |
|---|---|---|---|
| | | Temperature in ° C. | |
| Volume Percent of Components | | Start of | Cloud |
| BBP | DHA | Cloudiness | Point |
| 100 | 0 | 92 | 86 |
| 80 | 20 | 80 | 74 |
| 60 | 40 | −20 | 3* |
| 40 | 60 | 90 | 85 |
| 20 | 80 | 110 | 105 |
| 0 | 100 | 130 | 128 |

*Not fully clouded. Cloud point therefore somewhere below the lowest temperature recorded.

From the above it is apparent that DHA has the lowest level of compatibility with the particular PVB used. However partial replacement of DHA with BBP raises the compatibility until a proportion of about 70:30 BBP to DHA is reached after which the compatibility begins to drop. Thus within a certain range, roughly from about 95:5 to 40:60 BBP to DHA volume ratio the combination has a lower cloud point than either component. This is most unexpected and indicates a possibility that an interlayer using a plasticizer having a composition within this range could be used to make a laminate that would show less edge separation than using an interlayer plasticized with either plasticizer alone.

EXAMPLE 2

This Example shows the effect on the absorption of a plasticizer mixture consisting of BBP and DHA of varying the proportions in the blend.

The technique used was that described above and the results are set forth in Table II below.

TABLE II

| ABSORPTION | | | |
|---|---|---|---|
| Volume Proportions of | | Absorption in Parts Per Hundred | |
| BBP | DHA | AT 30° C. | AT 23° C. |
| 100 | 0 | 122 | 98 |
| 80 | 20 | 138 | 110 |
| 60 | 40 | 138 | 110 |
| 40 | 60 | 119 | 96 |
| 20 | 80 | 93 | 76 |
| 0 | 100 | 66 | 55 |

It can be seen that the pattern shown in Table I is repeated with DHA showing the least compatibility. When the DHA plasticizer is blended with over 45 percent by volume of BBP, the compatibility is greater than that of either component with a maximum compatibility in ratios of from 40:60 to 80:20 by volume BBP:DHA.

EXAMPLE 3

This Example describes the results of exposing laminates comprising one interlayer of polyvinyl butyral plasticized with a 60:40 volume percent blend of butyl benzyl phthalate and dihexyl adipate, for a year in Florida. For the sake of comparison, two other interlayers were tested in the same way. In one, the plasticizer was the same except that dibutyl phthalate was substituted for butyl benzyl phthalate. In the other a commercial plasticizer (3GH) that is widely used to plasticize polyvinyl butyrals was substituted for the blend.

Sample square of laminates were heated in an oil-filled autoclave to 149° C. and upon removal were cleaned off, cut into squares and exposed to the atmosphere and the sun for one year in Florida.

After the year the squares were rated for edge stability. Edges with more than three spots along the 15cm.

edge at which the interlayer was not flush with the glass were rated imperfect. The results are set forth in Table III below.

TABLE III

EDGE STABILITY AFTER FLORIDA EXPOSURE

| Plasticizer | Amount (PPH) | No. Edges | % Perfect |
|---|---|---|---|
| (1)DHA/BBP (40/60 ratio) | 45 and 47 | 72 | 100 |
| (2)DHA/DBP (40/60 ratio) | 45 | 36 | 75 |
| (3)3 GH | 48 | 36 | 36 |

(1)Dihexyl adipate/Butyl benzyl phthalate
(2)Dihexyl adipate/dibutyl phthalate
(3)Triethylene glycol di-2-ethylhexyl butyral

EXAMPLE 4

This Example illustrates the excellent performance of laminates made using plasticized interlayers according to the invention.

Sheets of polyvinyl butyral plasticized with different plasticizer combinations were laminated between sheets of glass and the resulting laminates were exposed to the weather in Florida for eighteen months. After a year and again after 18 months, the laminates were examined for defects.

Defects were points at which the interlayer had shrunk away from the glass laminae leaving an area of edge separation.

The results are set forth in Table IV wherein:

Interlayer A is a polyvinyl butyral containing 20 percent hydroxyl groups, measured as polyvinyl alcohol, plasticized with 40 pph of the plasticizer.
Interlayer B is a polyvinyl butyral containing 18.3 percent hydroxyl groups, measured as polyvinyl alcohol, plasticized with 35.5 pph of the plasticizer.
Interlayer C is a polyvinyl butyral containing 18.6 percent hydroxyl groups, measured as polyvinyl alcohol, plasticized with 34 pph of the plasticizer.

TABLE IV

| Interlayer | Plasticizer | Plasticizer Proportions | No. of Laminates Examined/with Defects after One Year | after 1½ Year |
|---|---|---|---|---|
| A | DHA/BBP | 50/50 | 10/0 | 10/0 |
| A | DHA/BBP | 65/35 | 10/0 | 10/4 |
| A | DHA/BBP | 80/20/ | 10/7 | 10/7 |
| B | DHA/BBP | 50/50 | 10/0 | 10/0 |
| B | DHA/BBP | 65/35 | 10/0 | 10/0 |
| B | DHA/BBP | 80/20 | 10/6 | 10/7 |
| C | DHA | 100 | 10/9 | 10/10 |

In each case the defects detected were spots along the edges of the laminates where shrinkage of the interlayer caused a separation from the glass laminae to a depth of less than 1.6mm. As can readily be seen, most of the laminates plasticized according to the invention showed no edge blemishes of even this minor sort.

EXAMPLE 5

This Example traces the change in low temperature impact strength with the proportions of the plasticizer components.

A polyvinyl butyral containing 21.5 percent hydroxyl groups (measured as polyvinyl alcohol) was compounded with the various plasticizer blends described in Table V below.

The various plasticized samples were formed into sheets about 0.76mm in thickness and laminated under identical conditions between sheets of glass to form a laminate about 2.5mm in thickness. The adhesion between the interlayer and the glass was controlled by the addition of a metallic salt.

The mean penetration velocity was determined by dropping a 2.27kg iron ball vertically on to 30.5cm square laminate samples until the ball either penetrated the sample or produced a split greater in length than one of the sides of the sample. The velocity of the ball at impact was calculated from the height of the ball when it was dropped.

The data obtained are reported in Table V below. The mean penetration velocity measurements are divided into two parts; A and B. Part A records the raw data which are only roughly comparable. Part B uses a computer model to adjust the raw data and place it on a strictly comparable basis in terms of interlayer thickness and adhesion.

TABLE V

IMPACT STRENGTH V. PLASTICIZER COMPOSITION

| Vol. Ratio DHA/BBP | Plasticizer Concentration (phr) | MEAN PENETRATION VELOCITY (km/hr) | | | | | |
|---|---|---|---|---|---|---|---|
| | | PART A (Interlayer thickness in mm) | | | PART B (Standardized) | | |
| | | −17.8° C. | −9.4° C. | −1.1° C. | −17.8° C. | −9.4° C. | −1.1° C. |
| 30/70 | 41.5 | 13.8(0.79) | 17.5(0.79) | 31.7(0.77) | 14 | 16.9 | 31.1 |
| 40/60 | 41.0 | 13.8(0.76) | 18.7(0.79) | 34.1(0.77) | 14 | 18.4 | 34.0 |
| 50/50 | 40.5 | 15.3(0.75) | 23.3(0.79) | 39.9(0.76) | 15.3 | 22.4 | 39.4 |
| 60/40 | 39.5 | 19.5(0.75) | 26.4(0.79) | 40.1(0.76) | 20.1 | 25.0 | 40.6 |
| 70/30 | 38.5 | 19.5(0.75) | 30.4(0.79) | 41.2(0.77) | 19.8 | 29.6 | 40.4 |

The data in Table V clearly show that the higher the proportion of butyl benzyl phthalate, the lower is the low temperature impact strength as measured by the mean penetration velocity. It is obvious from the values quoted that at low temperatures the higher the proportion of dihexyl adipate, the better the impact strength which is surprising over that portion of the compositional range where compatibility increases as the proportion of dihexyl adipate is increased.

There are many variations and modifications that can be made to the invention described herein without departing from the basic concept. It is intended that all such variations and modifications shall be embraced within the purview of this invention.

What is claimed is:

1. A polyvinyl butyral interlayer for a laminated glazing unit plasticized with an effective amount of a blend of plasticizers consisting of from 15 to 85 percent by volume of a di($C_5$ to $C_8$ alkyl) adipate and correspondingly from 85 to 15 percent by volume of a $C_3$ to $C_6$ alkyl benzyl phthalate.

2. A interlayer according to claim 1 in which the adipate is dihexyl adipate.

3. A interlayer according to claim 1 in which the phthalate is butyl benzyl phthalate.

4. A interlayer according to claim 1 in which the volume ratio of adipate to phthalate is from 30:70 to 70:30.

5. A polyvinylbutyral interlayer for a laminated glazing unit comprising, as plasticizer therefor, from 20 to 50 parts by weight, based on 100 parts by weight of polyvinylbutyral, of a blend of 30 to 70 percent by volume of dihexyl adipate and correspondingly from 70 to 30 parts by volume of butyl benzyl phthalate.

6. A laminated glazing unit comprising a layer of a polyvinylbutyral composition according to claim 1.

7. A lamainated glazing unit comprising a layer of a polyvinylbutyral composition according to claim 5.

* * * * *